United States Patent
Peri et al.

(10) Patent No.: US 9,898,519 B2
(45) Date of Patent: Feb. 20, 2018

(54) SYSTEMS AND METHODS OF ENRICHING CRM DATA WITH SOCIAL DATA

(71) Applicant: salesforce.com, inc., San Francisco, CA (US)

(72) Inventors: Harish Peri, San Francisco, CA (US); Saurin G Shah, Belmont, CA (US); Blake Markham, San Francisco, CA (US); Ashwini Govindaraman, Hayward, CA (US)

(73) Assignee: salesforce.com, inc., San Francisco, CA (US)

(*) Notice: Subject to any disclaimer, the term of this patent is extended or adjusted under 35 U.S.C. 154(b) by 119 days.

(21) Appl. No.: 14/028,277

(22) Filed: Sep. 16, 2013

(65) Prior Publication Data

US 2014/0081913 A1    Mar. 20, 2014

Related U.S. Application Data

(60) Provisional application No. 61/701,496, filed on Sep. 14, 2012, provisional application No. 61/835,152, filed on Jun. 14, 2013, provisional application No. 61/835,168, filed on Jun. 14, 2013.

(51) Int. Cl.
*G06F 17/30* (2006.01)
*G06Q 50/00* (2012.01)

(52) U.S. Cl.
CPC ....... *G06F 17/30581* (2013.01); *G06Q 50/01* (2013.01)

(58) Field of Classification Search
CPC .................................................. G06F 17/30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

U.S. Appl. No. 14/028,311—Office Action dated Aug. 30, 2016, 35 pages.

*Primary Examiner* — Khanh Pham
(74) *Attorney, Agent, or Firm* — Haynes Beffel & Wolfeld LLP; Ernest J. Beffel, Jr.; Andrew L. Dunlap

(57) ABSTRACT

The technology disclosed relates to incorporating social data in CRM systems by a single social syn action. In particular, it relates to appending social data to prospect or contact objects of CRM systems by finding multiple social handles for the prospect or contact objects. The multiple social handles identify social profiles of the corresponding prospects or contacts on various social network platforms.

The technology disclosed also relates to personalizing customer service experience of customers. In particular, it relates to identifying conversation preferences and interests of the customers based on information specified in their social profiles on different social network platforms. The conversation preferences and interests are used to customize interactions with the customer during the course of the customer service.

16 Claims, 8 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,661,002 B2* | 2/2014 | Smith et al. ................. 707/694 |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0031232 A1* | 1/2009 | Brezina et al. ............... 715/764 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0145101 A1* | 6/2011 | Berger .............. G06F 17/30867 |
| | | 705/27.1 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0089690 A1* | 4/2012 | Hein et al. ..................... 709/206 |
| 2012/0117271 A1* | 5/2012 | Kennedy et al. ............. 709/248 |
| 2012/0143969 A1* | 6/2012 | Shenoy et al. ................ 709/206 |
| 2012/0233137 A1 | 9/2012 | Jakobson et al. |
| 2012/0272160 A1* | 10/2012 | Spivack ................. G06Q 10/10 |
| | | 715/752 |

(56) References Cited

U.S. PATENT DOCUMENTS

| | | |
|---|---|---|
| 2012/0290407 A1 | 11/2012 | Hubbard et al. |
| 2012/0303652 A1* | 11/2012 | Tseng .......................... 707/769 |
| 2013/0046704 A1 | 2/2013 | Patwa et al. |
| 2013/0067039 A1* | 3/2013 | Hartzler et al. .............. 709/219 |
| 2013/0212497 A1 | 8/2013 | Zelenko et al. |
| 2013/0247216 A1 | 9/2013 | Cinarkaya et al. |
| 2013/0311315 A1* | 11/2013 | Zises ................. G06Q 30/0605 705/26.2 |
| 2014/0237057 A1* | 8/2014 | Khodorenko ....... H04L 12/1831 709/206 |

\* cited by examiner

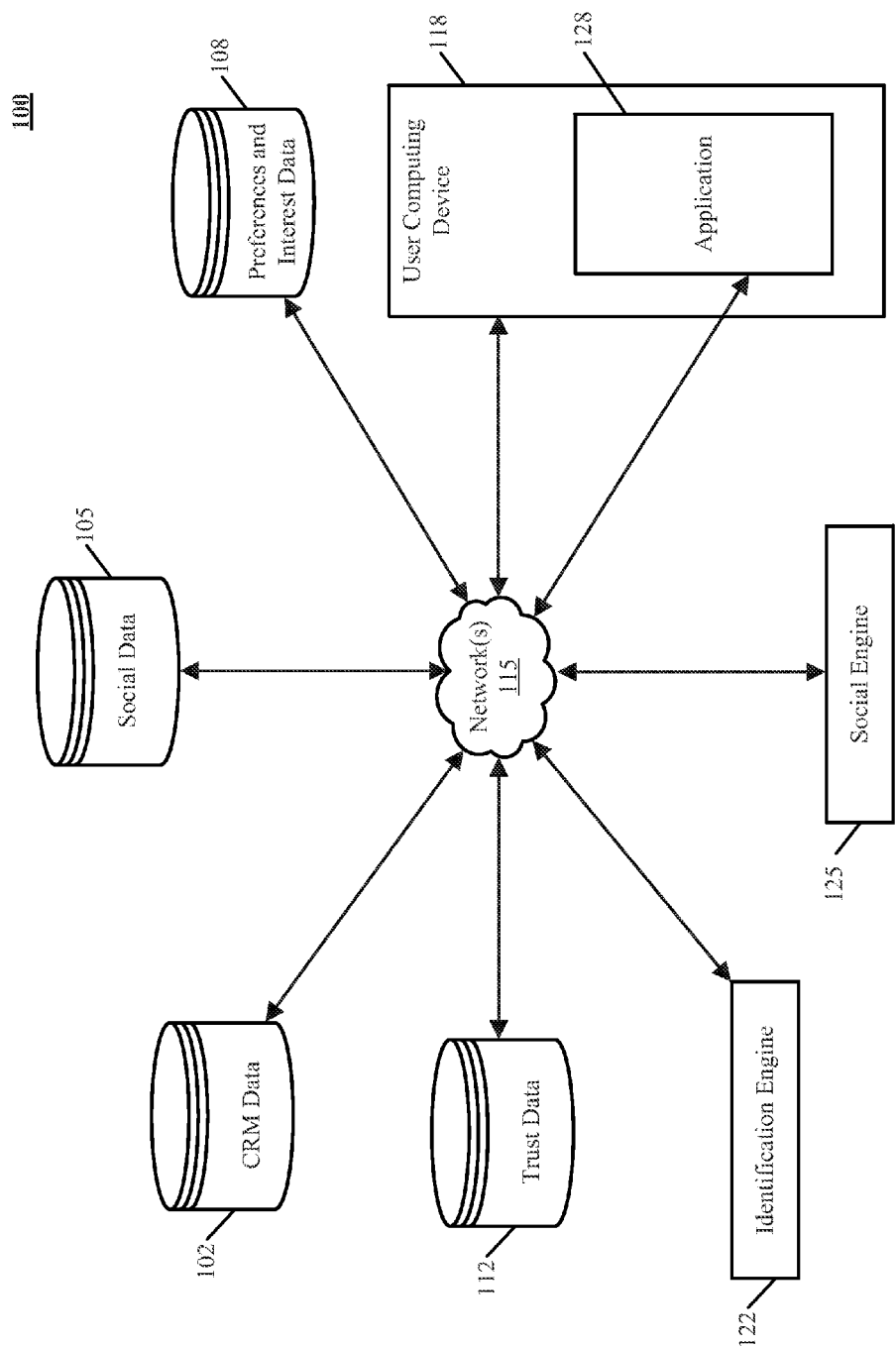
FIG. 1 – Servers, Clients, and Databases

| salesforce | | | | | | | | Logout |
|---|---|---|---|---|---|---|---|---|
| Home | Leads | Accounts | Contacts | Opportunities | Files | Reports | Dashboards | |

| Social Syn — 202 | CRM Data — 102 | | Social Data — 105 | | | Trust Data — 112 | |
|---|---|---|---|---|---|---|---|
| Action | Name | Email | Company | Twitter | Facebook | LinkedIn | Klout Score | Source |
| Edit\|Del | B, A | andrew@tec.com | Acme | | | | | Advertisement |
| Edit\|Del | B, A | andy@ibrn.com | None | | | | | |
| Edit\|Del | Ben, Marc | | None | @benioff | | | | Trade Show |
| Edit\|Del | Brneman, J | | None | @jasonbrn | | | | |
| Edit\|Del | C, George | cgeorge@mtr.com | NYOB | | | | | |
| Edit\|Del | First, Last | | Boggle | @ericsmd | | | | |
| Edit\|Del | G, J | j.gar@3dway.com | 3D Waves | | | | | Advertisement |
| Edit\|Del | Jones, Jim | | Jim's | @jimjones | | | | Other |

FIG. 2A – Incomplete CRM Data

| | | CRM Data — 102 | | Social Data — 105 | | | Trust Data — 112 |
|---|---|---|---|---|---|---|---|
| Action | Name | Email | Company | Twitter | Facebook | LinkedIn | Klout Score | Source |
| Edit \| Del | Benioff, Marc | ceo@sf.com | Salesforce | @benioff | benioff | benioff | 90 | Advertisement |
| Edit \| Del | Bilson, Andrew | andy15@ibm.com | None | @andyb | Andy-B | AndyB | 38 | API |
| Edit \| Del | Brneman, Jason | jsonb@grndt.com | Green Dot | @jasonbrn | JasonBrn | Jasonbrn | 45 | Trade Show |
| Edit \| Del | Clon, George | g.clon@mtr.com | Mtr TV | @georgec | Clonster | ClonGrg | 77 | Public Internet |
| Edit \| Del | Gardner, John | j.gar@3dwav.com | 3D Waves | @jgardner | John-E-Gar | JGardner | 30 | Blog |
| Edit \| Del | Jackson, Sam | samj@ibm.com | IBM | @samjack | Sam Jackson | SamJack | 61 | API |
| Edit \| Del | Jones, Jim | ceo@jims.com | Jim's | @jimjones | JamesJones | JimJones | 12 | Jigsaw |
| Edit \| Del | Loehr, Sarah | loehr@medl.com | MedLife | @supersar | sarahL | LoehrSarah | 90 | Public Internet |

FIG. 2B – Socially Enriched CRM Data

FIG. 3 — Rich User Profile

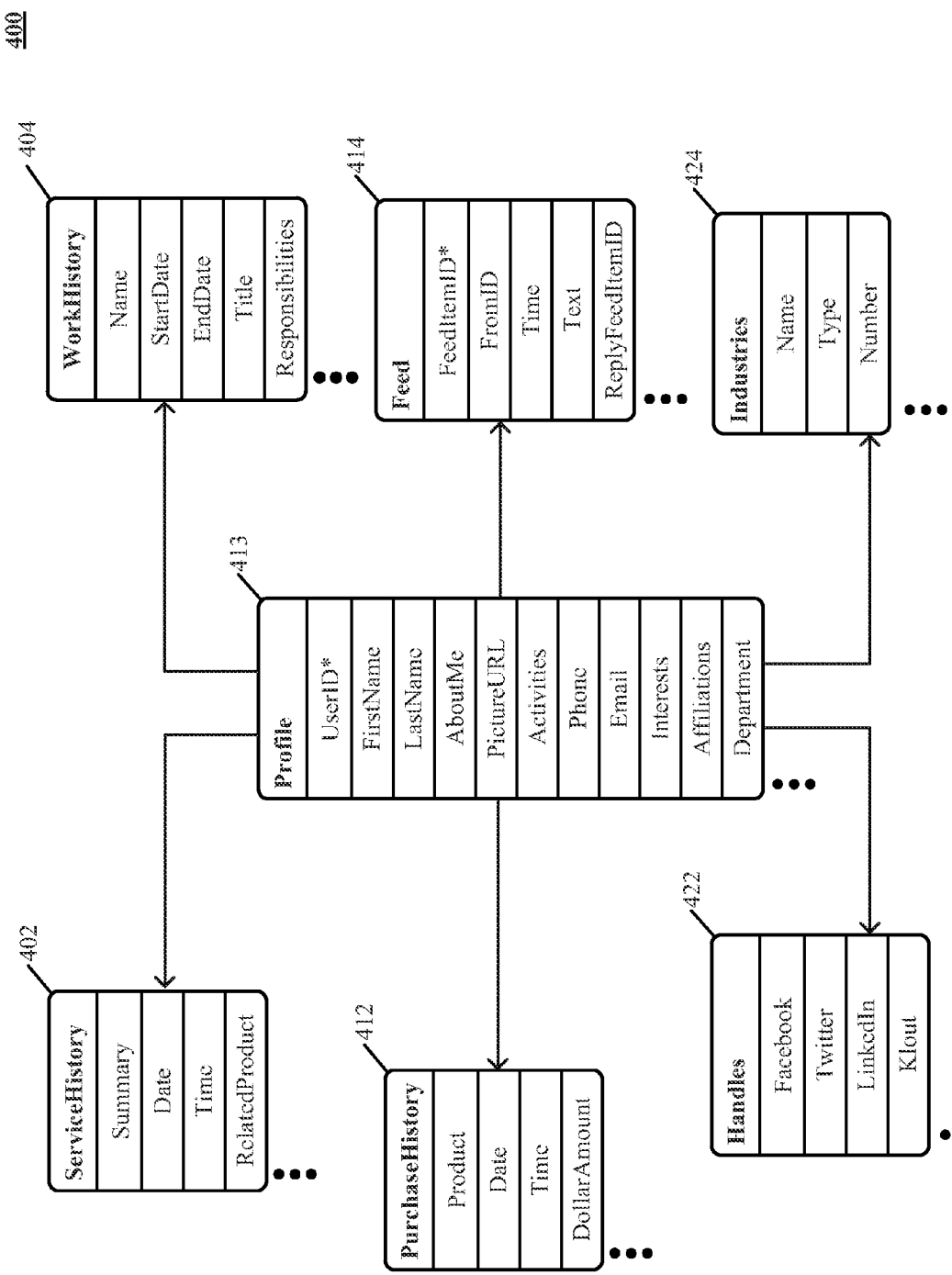
FIG. 4 – Social Data Schema

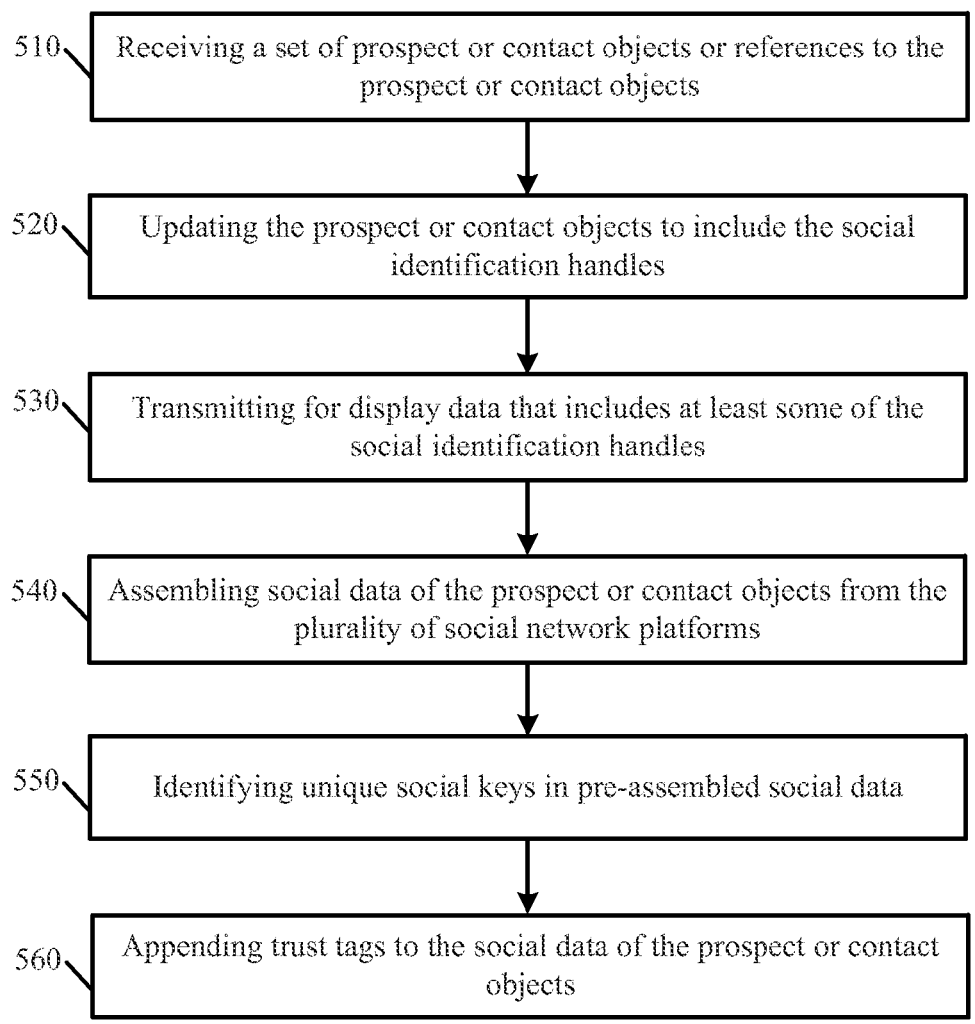
FIG. 5 – Flowchart of Relating CRM Data to Social Data

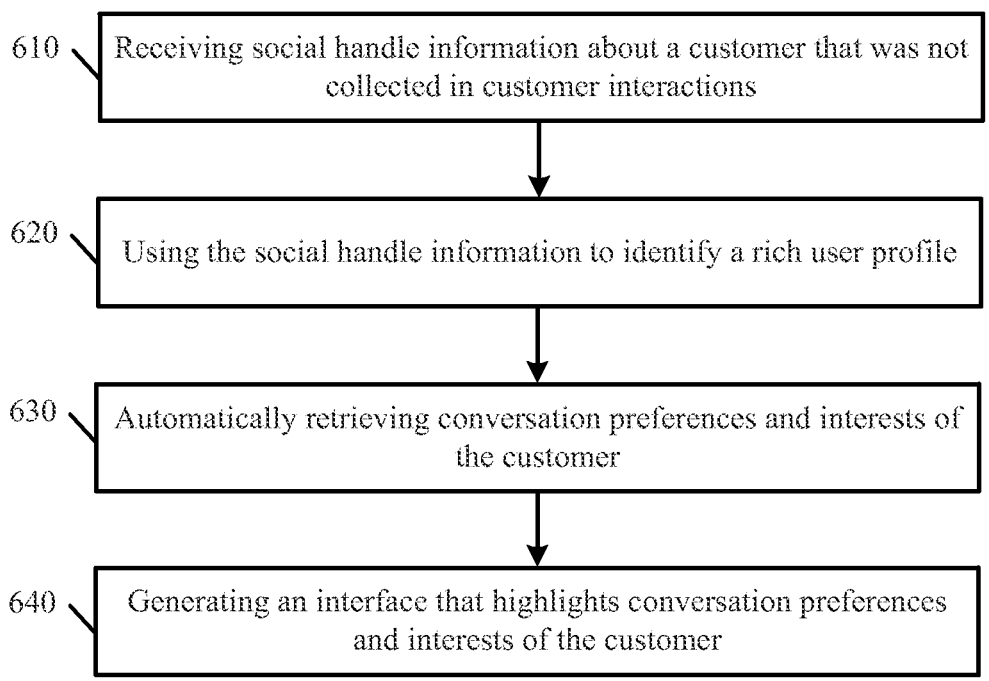
FIG. 6 – Flowchart of Personalizing Customer Service Experience

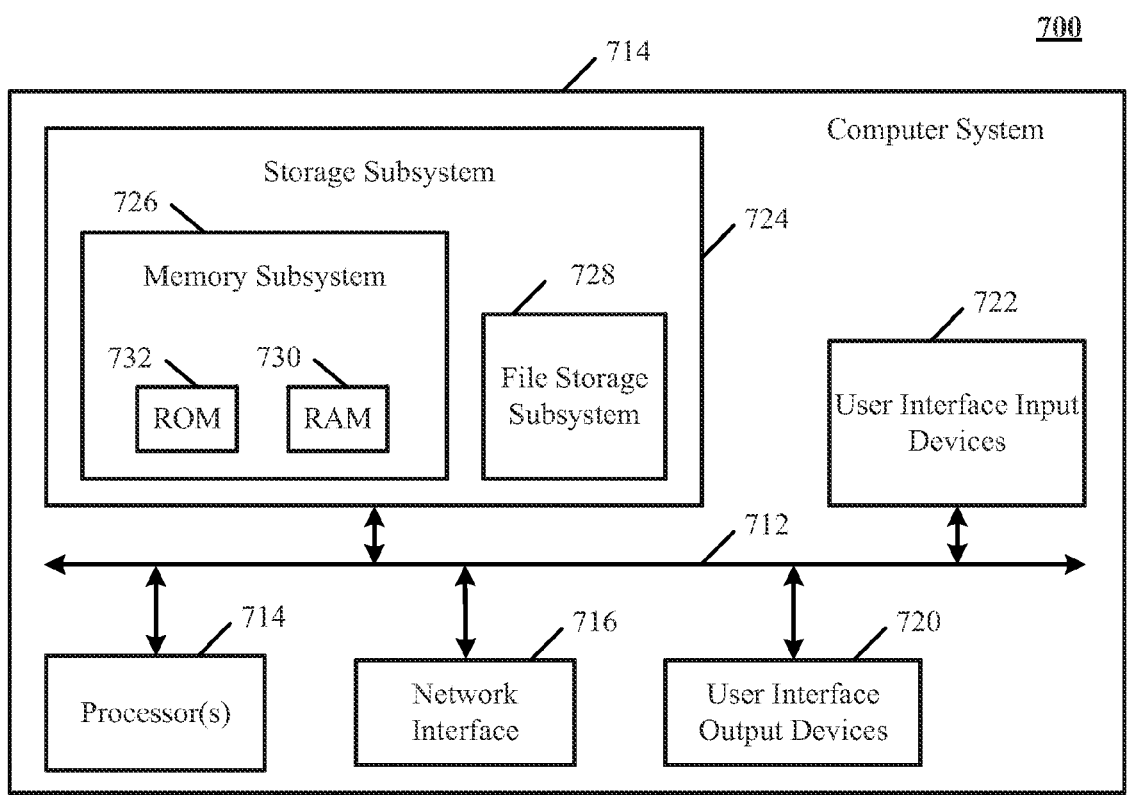
FIG. 7 – Computer System

SYSTEMS AND METHODS OF ENRICHING CRM DATA WITH SOCIAL DATA

RELATED APPLICATION

This application claims the benefit of three U.S. provisional Patent Applications, including: No. 61/701,496, entitled, "De-Duplicating Social Network Profiles to Build a Consolidated Social Profile," filed 14 Sep. 2012; No. 61/835,152, entitled, "Systems and Methods for Creating Unified Social Profiles of Users in a Multi-Tenant Environment," filed 14 Jun. 2013; and No. 61/835,168, entitled, "Systems and Methods for Relating Internal CRM Data to External Social and Public Source Data," filed 14 Jun. 2013. The provisional applications are hereby incorporated by reference for all purposes.

This application is related to U.S. patent application Ser. No. 14/028,311, entitled "Systems and Methods of Providing a Streamlined Referral Flow," filed on Sep. 16, 2013. The related application is incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Social network platforms have revolutionized the way users communicate and share information with each other. On these platforms, users share substantial amount of personal and professional information along with their likes, interests, and hobbies. However, this information has not found its way into customer relationship management (CRM) systems.

An opportunity arises to efficiently enrich CRM systems with reliable and diverse social data. An opportunity also arises to customize customer service based on their preferences and interests of the customers. Improved user experience and engagement and higher customer satisfaction and retention may result.

SUMMARY

The technology disclosed relates to incorporating social data in CRM systems by a single social syn action. In particular, it relates to appending social data to prospect or contact objects of CRM systems by finding multiple social handles for the prospect or contact objects. The multiple social handles identify social profiles of the corresponding prospects or contacts on various social network platforms.

The technology disclosed also relates to personalizing customer service experience of customers. In particular, it relates to identifying conversation preferences and interests of the customers based on information specified in their social profiles on different social network platforms. The conversation preferences and interests are used to customize interactions with the customer during the course of the customer service.

Other aspects and advantages of the present technology can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows example servers, clients, and databases used for enriching CRM data with social data.

FIG. 2A illustrates one implementation of incomplete CRM data within a CRM system.

FIG. 2B is one implementation of socially enriched CRM data within a CRM system.

FIG. 3 shows one implementation of a rich user profile used for personalizing customer service experience of a customer.

FIG. 4 illustrates one implementation of a social data schema that can be used for enriching CRM data with social data.

FIG. 5 is a flowchart of one implementation of enriching CRM data with social data.

FIG. 6 shows a flowchart of one implementation of personalizing customer service experience of customers.

FIG. 7 is a block diagram of an example computer system for enriching CRM data with social data.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to enriching CRM data with social data by using computer-implemented systems. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology may be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

The technology disclosed can be applied to solve the technical problem of incomplete social data in CRM systems. With the social media revolution, social network platforms can provide new channels for the CRM systems. The technology disclosed provides accurate and reliable social data of customers from a variety of social network platforms, which can be used by companies to deepen their relationships with customers through targeted campaigning, meaningful conversations, and compliance of engagement preferences.

In some implementations, the technology disclosed can be used to prevent duplication of social data of the customers. This is done by assigning unique social keys to the customers. The unique social keys serve as common links to different social profiles of the customers. In other implementations, the technology disclosed can enhance the transparency of traditional CRM systems by trust tagging the social data incorporated in them. The trust tagging includes tracking the assembling of social data from various social network platforms by recording the source, type, and jurisdictional origins of the social network platforms. In one implementation, engagement preferences of the customers with respect to the assembled social data are also identified.

Another feature of the technology disclosed relates to personalizing the customer service experience of customers by identifying their conversation preferences and interests based on information specified in their social profiles. In some implementations, the technology disclosed can generate personality insights for the customers based on purchase history and customer service history of the customers. The personality insights can be used to customize customer service according to the attributes and background of the customers.

Servers, Clients, and Databases

FIG. 1 shows example servers, clients, and databases 100 used for enriching CRM data with social data. FIG. 1 includes CRM data 102, social data 105, preferences and interest data 108, and trust data 112. FIG. 1 also includes network(s) 115, identification engine 122, social engine 125, user computing device 118, and application 128. In other implementations, servers, clients, and databases 100 may not have the same elements as those listed above and/or may have other/different elements instead of, or in addition to, those listed above such as a synchronization engine or a personalization engine. The different elements can be combined into single software modules and multiple software modules can run on the same hardware.

In some implementations, network(s) 115 can be any one or any combination of Local Area Network (LAN), Wide Area Network (WAN), WiFi, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, the engines can be of varying types including workstations, servers, computing clusters, blade servers, server farms, or any other data processing systems or computing devices. The engines can be communicably coupled to the databases via a different network connection. For example, identification engine 122 can be coupled via the network(s) 115 (e.g., the Internet) and social engine 125 can be coupled via a direct network link or a different network connection.

In some implementations, databases can store information from one or more tenants into tables of a common database image to form a multi-tenant database system (MTS). A database image can include one or more database objects. In other implementations, the databases can be relation database management systems (RDBMSs), object oriented database management systems (OODBMSs), distributed file systems (DFS), no-schema database management systems, or any other data storing systems or computing devices.

User computing device 118 can be a personal computer, laptop computer, tablet computer, smartphone, personal digital assistant (PDA), digital image capture devices, and the like. Application 128 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based application running on the user computing device 118. It can also be hosted on a non-social local application running in an on-premise environment. In one implementation, it can be accessed from a browser running on a computing device. The browser can be Chrome, Internet Explorer, Firefox, Safari, and the like. In other implementations, application 128 can run as engagement consoles on a computer desktop application.

CRM data 102 includes various entities (persons and organizations) such as prospects, leads, and/or accounts and further provides business information related to the respective entities. Examples of business information can include: names, addresses, job titles, number of employees, industry types, territories, market segments, contact information, employer information, stock rate, etc. In one implementation, CRM data 102 can store web or database profiles of the users and organizations as a system of interlinked hypertext documents that can be accessed via the network(s) 115 (e.g., the Internet). In another implementation, CRM data 102 can also include standard profile information about persons and organizations. This standard profile information can be extracted from company websites, business registration sources such as Jigsaw, Hoovers, or Dun & Bradstreet, business intelligence sources, and/or social networking websites like Yelp, Yellow Pages, etc.

A "prospect" refers to an entity (person or organization) that has expressed interest in a product or service of a seller or service provider. Conversely, a prospect can be an entity that may not have expressed interest but appears to have a profile similar to that of seller's or service provider's target customer. In one implementation, prospects can be stored based on industry type, market segment, number of employees, customer segment, employee size, product line, service type, stock rate, location, or territory. In another implementation, CRM data 102 can include business-to-business data of an individual belonging to or working for a prospect, referred to as "contact," along with some supplemental information. This supplemental information can be names, addresses, job titles, usernames, contact information, employer name, etc.

Regarding different types of social network platforms, access controlled application programming interfaces (APIs) like Yahoo Boss, Facebook Open Graph, Twitter Firehose can provide real-time search data aggregated from numerous social media sources such as LinkedIn, Yahoo, Facebook, and Twitter. APIs can initialize sorting, processing, and normalization of data. Public Internet can provide data from public sources such as first hand websites, blogs, web search aggregators, and social media aggregators.

Social networking sites can provide data from social media sources such as Twitter, Facebook, LinkedIn, and Klout.

Social engine 125 spiders various social network platforms to retrieve social data 105 related to CRM data 102, including web data associated with the business-to-business contacts. In some implementations, social engine 125 can extract a list of contacts from a master database and search those contacts on the various social network platforms in order to determine if social or web content associated with the contacts exists within those platform. If the social network platforms provide positive matches to any of the contacts, the social engine 125 can store the retrieved social or web content as social data 105.

Social data 105 stores social media content assembled from different types of social network platforms. Social media content can include information about social media sources, social accounts, social personas, social profiles, social handles, etc. of the business-to-business contacts stored in CRM data 102.

In some implementations, social data 105 can include a feed that is a combination (e.g. a list) of feed items. A feed item or feed element can include information about a user of the database referred to as profile feed or about a record referred to as record feed. A user following the user or record can receive the associated feed items. The feed items from all of the followed users and records can be combined into a single feed for the user. The information presented in the feed items can include entries posted to a user's wall or any other type of information accessible within the social network platform. For example, a user's news feed can include text inputs such as comments (e.g., statements, questions, and emotional expressions), responses to comments (e.g., answers, reactionary emotional expressions), indications of personal preferences, status updates, and hyperlinks. As another example, a news feed can include file uploads, such as presentations, documents, multimedia files, and the like.

Identification engine 122 retrieves conversation preferences and interests of the users from social data 105 by applying semantic analysis and keyword extraction to at least one of: information specified in social profiles of the users, text of feed items posted by the users, service records related to the users, and purchase histories of the users. The retrieved conversation preferences and interests are stored as preferences and interest data 108. The semantic analysis can include identifying preferences and interests keywords (also stored as preferences and interest data 108) associated with one or more user characteristics in the social profiles and further assigns each preferences and interests keyword a value. The value of each identified preferences and interests keyword is then used to calculate a score for the user characteristic to which the preferences and interests keyword is correlated. In some implementations, identification engine 122 counts: the number of occurrences of preferences and interests keywords within the text of feed items posted by the users and the number of postings of the feed items including the preferences and interests keywords.

Identification engine 122 enhances the trust of assembled social data 105 by appending trust tags (stored as trust data 112) to various data objects in social data 105. The trust tags include names of the social network platforms, interface categories of the social network platforms, jurisdictional origins of the social network platforms, and engagement preferences of prospects or contacts.

Social Syn Action

FIG. 2A illustrates one implementation of incomplete CRM data within a CRM system 200 such as Salesforce's Chatter. Conversely, FIG. 2B is one implementation of socially enriched CRM data within the CRM system 200. As shown in FIGS. 2A-2B, CRM system 200 includes a social syn button 202, CRM data columns 102, social data columns 105, and trust data columns 112. In other implementations, CRM system 200 may not have the same screen objects, interfaces, or widgets as those listed above and/or may have other/different screen objects, interfaces, or widgets instead of, or in addition to, those listed above such as a clean status column (that identifies if social data about a prospect or contact is found or not), unique social key column, phone column, interface categories column, jurisdictional origin column, engagement preferences column, etc. The different elements can be combined into single software modules and multiple software modules can run on the same hardware.

FIG. 2A shows a list of prospect or contact objects (Ben, Marc and C, George) or references to the prospect or contact objects (Email and Company) with blank, incomplete, or inadequate fields for CRM data columns 102, social data columns 105, and trust data columns 112. CRM data columns 102 identify business-to-business information (Name, Email, Company) associated with the prospects or contacts. Also, social data columns 105 specify social handles of the prospects or contacts on various social network platforms (Twitter, Facebook, LinkedIn, and/or Klout). Finally, trust data columns 112 identify one or more trust tags associated with the social data of the prospects or contacts, including names of the social network platforms, interface categories of the social network platforms, jurisdictional origins of the social network platforms, and engagement preferences of the prospects or contacts.

FIG. 2B shows updates to the CRM system 200 in response to selection of the social syn button 202. As shown in FIG. 2B, CRM system 200 is enriched with social data corresponding to the prospect or contact objects. The social data specifies different social handles (@andyb, Andy-B, AndyB) for the prospects or contacts on various social network platforms. Any missing fields in the CRM data columns 102 are filled with the appropriate business information, such as names and email of the prospects or contacts. FIG. 2B further identifies particular sources (API, Blog, Jigsaw, etc.) from which the social data was assembled.

Rich User Profile

FIG. 3 shows one implementation of a rich user profile 300 used for personalizing customer service experience of a customer 301. Rich user profile 300 includes customer biographic information 302, customer social handle information 304, customer employment history 312, one or more industries customer 301 works in 322, and/or topics 344 and entities 354 that customer 301 is interested in. It also includes customer purchase history 324 and customer service records 334. In other implementations, rich user profile 300 may not have the same screen objects, interfaces, or widgets as those listed above and/or may have other/different screen objects, interfaces, or widgets instead of, or in addition to, those listed above such as skills and expertise of customer 301, connections and colleagues of customer 301, social influence of customer 301, etc. The different elements can be combined into single software modules and multiple software modules can run on the same hardware.

Social handle information 304 can be used to identify the rich user profile 300 that includes information from social network platforms (social data 105) external to the CRM system 200 such as Facebook, Twitter, and/or LinkedIn. In some implementations, semantic analysis and keyword extraction can be applied to social data 105 to retrieve conversation preferences and interests of customer 301. In some implementations, the conversation preferences and interests can be used to generate personality insights about customer 301, including customer's: IQ level, literacy level, technical expertise, and the like.

In some implementations, the personality insights can enable customer service agents to customize their conversation with customer 301 in a way that maximizes the customer's user experience. In one example, customer purchase history 324 can be used to make an up sale offer of similar products or of upgrades to products previously purchased by customer 301. In another example, customer service records 334 can be used to estimate customer's technical expertise, which can be further used to determine the level of complexity of solutions given to customer 301. In yet another example, customer biographic information 302, customer employment history 312, one or more industries customer 301 works in 322, and/or topics 344 and entities 354 that customer 301 is interested in, can be used to initiate customer-specific conversations during the customer service, which invoke customer's interest and engagement and thus, enhance the customer's user experience.

Social Data Schema

FIG. 4 illustrates one implementation of a social data schema 400 that can be used for enriching CRM data with social data. This and other data structure descriptions that are expressed in terms of objects can also be implemented as tables that store multiple records or object types. Reference to objects is for convenience of explanation and not as a limitation on the data structure implementation. FIG. 4 shows a profile object 413 linked to service history object 402, work history object 404, purchase history object 412, feed object 414, handles object 422, and industries object 424. In other implementations, social data schema 400 may not have the same objects, tables, fields or entries as those listed above and/or may have other/different objects, tables, fields or entries instead of, or in addition to, those listed above such as a topic object, interest object, or contact information object.

Profile object 413 provides primary information that identifies a customer and includes various fields that store biographic information about the customer such as first name, last name, sex, birthday, department, interests, etc. In some implementations, the profile object 413 can be further linked to other objects that provide supplementary information about the customer. For instance, profile object 413 can be linked to a service history object 402 that stores a summary, date, and time of past customer service requests made the customer. In one implementation, profile object 413 can be linked to a purchase history object 412 that identifies the products previously purchased by the customer along with a data, time, and dollar amount of the purchase.

In one implementation, profile object 413 can be linked to at least one of: a work history object 404 that specifies customer's past employers, along with employment start and end dates, job titles, and job responsibilities; a handles object 422 that identifies social handles of the customer on various social network platforms like Facebook, Twitter, LinkedIn, and/or Klout; a feed object 414 that specifies various feeds items such as posts, comments, replies, mentions, etc. posted by the customer or on customer's social profile; and an industries objects 424 that includes the name, type, and reference number of industries the customer works in.

In yet another implementation, schema 400 can have one or more of the following variables with certain attributes: USER_ID being CHAR (14 BYTE), SERVICE_RECORDS_ID being CHAR (14 BYTE), PURCHASE_RECORDS_ID being CHAR (14 BYTE), INDUSTRY_ID being CHAR (14 BYTE), TAG_FORMAT_ID being CHAR (14 BYTE), FEED_ITEM_ID being CHAR (14 BYTE), CREATED_BY being CHAR (14 BYTE), CREATED_DATE being DATE, and DELETED being CHAR (1 BYTE).

Flowchart of Enriching CRM Data with Social Data

FIG. 5 is a flowchart 500 of one implementation of enriching CRM data with social data. Flowchart 500 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 5. Multiple actions can be combined in some implementations. For convenience, this flowchart is described with reference to the system that carries out a method. The system is not necessarily part of the method.

At action 510, responsive to a first social sync action, a set of prospect or contact objects or references to the prospect or contact objects are received along with a request to fill in a plurality of blank fields in the objects with social identification handles from a plurality of social network platforms that are independently operated. In some implementations, a specification is received that designates which blank fields in the prospect or contact objects to fill in with social data. The first social sync action refers to a user commit behavior that can be executed by a voice, visual, physical, or text command. Examples of the first social sync action can include: speaking in a microphone, blinking of eye across an eye tracking device, moving a body part across a motion sensor, pressing a button on a device, selecting a screen object on an interface, or entering data across an interface.

At action 520, the prospect or contact objects are updated to include the social identification handles. Examples of social identification handles include Facebook usernames, Twitter handles, and/or LinkedIn links. In some implementations, Twitter handles can be identified by "@identifier" tag formats. Similarly, Facebook usernames can be identified by tag formats such as "www.facebook.com/identifier," and LinkedIn links can include "www.linkedIn.com/identifier" tag formats.

At action 530, data that includes at least some of the social identification handles or references to the social identification handles is transmitted for display along with an interface that shows that at least some of the blank fields have been filled in.

At action 540, social data of the prospect or contact objects is assembled from the plurality of social network platforms, including social identification handles. Various entity resolution techniques can be applied to identify web mentions and reflections that include social data of the prospect or contacts objects. Examples of entity resolution techniques can include: disambiguation, clustering, iterative record linkage, adaptive duplicate detection, or training-set construction, etc.

At action 550, unique social keys in pre-assembled social data are identified. The unique social keys correspond to the prospect or contact objects and updating the prospect or contact objects with the unique social keys. Furthermore, in response to a subsequent social sync action, the unique social keys or references to the unique social keys or references to the prospect or contact objects are received and the prospect or contact objects are updated to include further social data assembled subsequent to the first social sync action.

At action 560, trust tags are appended to the social data of the prospect or contact objects. The trust tags include names of the social network platforms, interface categories of the social network platforms, jurisdictional origins of the social network platforms, and engagement preferences of prospects or contacts. The interface categories of the social network platforms include access controlled APIs, public Internet, and social networking sites. The jurisdictional origins of the social network platforms specify engagement rules applicable to geographic locations of the social network platforms. The engagement preferences of the prospects or contacts specify whether the prospects or contacts have opted-in or opted-out of any use of their social identification handles.

Flowchart of Personalizing Customer Service Experience

FIG. 6 shows a flowchart of one implementation of personalizing customer service experience of customers. Flowchart 600 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 6. Multiple actions can be combined in some implementations. For convenience, this flowchart is described with reference to the system that carries out a method. The system is not necessarily part of the method.

At action 610, social handle information about a customer that was not collected in customer interactions directly with a CRM system is received. Examples of social handle information include Facebook usernames, Twitter handles, and/or LinkedIn links. In some implementations, Twitter handles can be identified by "@identifier" tag formats. Similarly, Facebook usernames can be identified by tag formats such as "www.facebook.com/identifier," and LinkedIn links can include "www.linkedIn.com/identifier" tag formats.

At action 620, the social handle information is used to identify a rich user profile that includes information collected from social network platforms external to the CRM system. The rich user profile includes biographic information about the customer. It also includes at least employment history and skills and expertise of the customer. It also identifies one or more industries the customer works in along with topics and entities that interest the customer. It further includes purchase history and customer service history of the customer.

At action 630, in response to the social handle information, conversation preferences and interests of the customer are automatically retrieved from the rich user profile. In some implementations, conversation preferences and interests are retrieved by applying semantic analysis and keyword extraction to at least one of: information specified in social profiles of the customer, text of feed items posted by the customer, service records related to the customer, and purchase histories of the customer.

At action 640, an interface is generated that highlights conversation preferences and interests of the customer for use in interactions with the customer. The conversation preferences and interests of the customer can be used to generate personality insights that can enable customer service agents to customize their conversations with the customer in a way that maximizes the customer's user experience.

Computer System

FIG. 7 is a block diagram of an example computer system 700 for enriching CRM data with social data. FIG. 7 is a block diagram of an example computer system, according to one implementation. Computer system 710 typically includes at least one processor 714 that communicates with a number of peripheral devices via bus subsystem 712. These peripheral devices can include a storage subsystem 724 including, for example, memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to corresponding interface devices in other computer systems.

User interface input devices 722 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 710.

User interface output devices 720 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules and methods described herein. These software modules are generally executed by processor 714 alone or in combination with other processors.

Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative implementations of the bus subsystem can use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

Particular Implementations

In one implementation, a method is described from the perspective of a server receiving messages from user software. The method includes, in response to a first social sync action, receiving a set of prospect or contact objects or references to the prospect or contact objects and a request to fill in a plurality of blank fields in the objects with social identification handles from a plurality of social network platforms that are independently operated. It also includes updating the prospect or contact objects to include the social identification handles. It further includes transmitting for display data that includes at least some of the social identification handles or references to the social identification handles and an interface that shows that at least some of the blank fields have been filled in.

This and other method described can be presented from the perspective of a mobile device and user software interacting with a server. From the mobile device perspective, the method relates CRM data to social data, relying on the server for, in response to a first social sync action, receiving a set of prospect or contact objects or references to the prospect or contact objects and a request to fill in a plurality of blank fields in the objects with social identification handles from a plurality of social network platforms that are independently operated. The method also includes updating the prospect or contact objects to include the social identification handles. In some implementations, the server transmits data, through the mobile device that includes at least some of the social identification handles or references to the social identification handles and an interface that shows that at least some of the blank fields have been filled in.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as social syn action, rich user profile, or social data schema.

The method also includes assembling social data of the prospect or contact objects from the plurality of social network platforms, including social identification handles. It further includes identifying unique social keys in pre-assembled social data that corresponds to the prospect or contact objects and updating the prospect or contact objects with the unique social keys.

The method also includes, in response to a subsequent social sync action, receiving the unique social keys or references to the unique social keys or references to the prospect or contact objects, updating the prospect or contact objects to include further social data assembled subsequent to the first social sync action, and transmitting for display data that includes at least some of the further assembled social data or references to the further assembled social data. It further includes receiving a specification of which blank fields in the prospect or contact objects to fill in with social data.

The method also includes appending trust tags to the social data of the prospect or contact objects. The trust tags include names of the social network platforms, interface categories of the social network platforms, jurisdictional origins of the social network platforms, and engagement preferences of prospects or contacts. The interface categories of the social network platforms include access controlled APIs, public Internet, and social networking sites.

The jurisdictional origins of the social network platforms specify engagement rules applicable to geographic locations of the social network platforms. The engagement preferences of the prospects or contacts specify whether the prospects or contacts have opted-in or opted-out of any use of their social identification handles.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described from the perspective of a server receiving messages from user software. The method receiving social handle information about a customer that was not collected in customer interactions directly with a CRM system. It also includes using the social handle information to identify a rich user profile that includes information collected from social network platforms external to the CRM system. It further includes, in response to the social handle information, automatically retrieving conversation preferences and interests of the customer from the rich user profile, and generating an interface that highlights conversation preferences and interests of the customer for use in interactions with the customer.

This method and other implementations of the technology disclosed can include one or more of the following features and/or features described in connection with additional methods disclosed.

The rich user profile includes biographic information about the customer. It also includes at least employment history and skills and expertise of the customer. It also identifies one or more industries the customer works in along with topics and entities that interest the customer. It further includes purchase history of the customer. It further specifies past service requests made by the customer.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A method, including:
   receiving, for display, a set of prospect or contact objects including information identifying multiple individuals or references to the set of prospect or contact objects;
   identifying a plurality of blank fields related to the multiple individuals identified by the received set of prospect or contact objects;
   upon receiving a selection from a user indicating a request to perform a social synchronization action to fill in the plurality of blank fields with multiple social identification handles of the multiple individuals:
      automatically spidering a plurality of social network platforms to obtain the multiple social identification handles of the multiple individuals identified by the received set of prospect or contact objects or the references to the set of prospect or contact objects, wherein the social network platforms are independently operated; and updating the received set of prospect or contact objects to include the obtained multiple social identification handles of the multiple individuals; and transmitting for display (i) data that includes at least some of the obtained multiple social identification handles or references to the obtained multiple social identification handles and (ii) an interface that shows that at least some of the blank fields of the received set of prospect or contact objects have been filled in.

2. The method of claim 1, further including assembling social data of the received set of prospect or contact objects from the plurality of social network platforms, including the social identification handles.

3. The method of claim 2, further including appending trust tags to the social data of the received set of prospect or contact objects, wherein the trust tags include names of the social network platforms, interface categories of the social network platforms, jurisdictional origins of the social network platforms, and engagement preferences of prospects or contacts.

4. The method of claim 3, wherein the interface categories of the social network platforms include access controlled application programming interfaces (APIs), public Internet, and social networking sites.

5. The method of claim 3, wherein the jurisdictional origins of the social network platforms specify engagement rules applicable to geographic locations of the social network platforms.

6. The method of claim 3, wherein the engagement preferences of the prospects or contacts specify whether the prospects or contacts have opted-in or opted-out of any use of their social identification handles.

7. The method of claim 1, further including identifying unique social keys in pre-assembled social data that corresponds to the received set of prospect or contact objects and updating the received set of prospect or contact objects with the unique social keys.

8. The method of claim 7, further including:

in response to a subsequent social sync action, receiving the unique social keys or references to the unique social keys or references to the received set of prospect or contact objects;

updating the received set of prospect or contact objects to include further social data assembled subsequent to the social synchronization action; and transmitting for display data that includes at least some of the further assembled social data or references to the further assembled social data.

9. The method of claim 1, further including receiving a specification designating which blank fields in the received set of prospect or contact objects are to be filled in with social data.

10. The method of claim 1, further comprising:

in response to obtaining the social identification handles, automatically retrieving conversation preferences and interests of the received set of prospect or contact objects or the reference to the prospect or contact objects; and generating an interface that highlights the conversation preferences and interests of the received set of prospect or contact objects or the reference to the prospect or contact objects.

11. The method of claim 10, further comprising:

assigning a value to each retrieved conversation preference and each retrieved interest;

calculating a score for a user characteristic of each prospect or contact object of the received set of prospect or contact objects using the assigned values of conversation preferences and interests that correlate to the user characteristic; and incorporating the calculated score into the received set of prospect or contact objects.

12. The method of claim 11, wherein the values are assigned to each retrieved conversation preference and each retrieved interest based on:

several occurrences of preference and interest keywords within a text of feed items included in social data posted by at least one prospect or contact object of the received set of prospect or contact objects; and several postings of the feed items including the preference and interest keywords.

13. A system, including:

a processor and a computer readable storage medium storing computer instructions configured to cause the processor to:

receive, for display, a set of prospect or contact objects including information identifying multiple individuals or references to the set of prospect or contact objects;

identify a plurality of blank fields related to the multiple individuals identified by the received set of prospect or contact objects;

upon receiving a selection from a user indicating a request to perform a social synchronization action to fill in the plurality of blank fields with multiple social identification handles of the multiple individuals:

automatically spidering a plurality of social network platforms to obtain the multiple social identification handles of the multiple individual identified by the received set of prospect or contact objects or the references to the set of prospect or contact objects, wherein the social network platforms are independently operated; and update the received set of prospect or contact objects to include the social identification handles of the multiple individuals; and transmit for display (i) data that includes at least some of the obtained multiple social identification handles or references to the obtained multiple social identification handles and (ii) an interface that shows that at least some of the blank fields of the received set of prospect or contact objects have been filled in.

14. The system of claim 13, further configured to cause the processor to assemble social data of the received set of prospect or contact objects from the plurality of social network platforms, including the social identification handles.

15. The system of claim 13, further configured to cause the processor to identify unique social keys in pre-assembled social data that corresponds to the received set of prospect or contact objects and to update the received set of prospect or contact objects with the unique social keys.

16. A non-transitory computer-readable storage medium impressed with computer program instructions, the instructions, when executed on a processor, implement a method, including:

receiving, for display, a set of prospect or contact objects including information identifying multiple individuals or references to the set of prospect or contact objects;

identifying a plurality of blank fields related to the multiple individuals identified by the received set of prospect or contact objects;

upon receiving a selection from a user indicating a request to perform a social synchronization action to fill in the plurality of blank fields with multiple social identification handles of the multiple individuals:

automatically spidering a plurality of social network platforms to obtain the multiple social identification handles of the multiple individuals identified by the received set of prospect or contact objects or the references to the set of prospect or contact objects, wherein the social network platforms are independently operated; and updating the received set of prospect or contact objects to include the obtained multiple social identification handles of the multiple individuals; and transmitting for display (i) data that includes at least some of the obtained multiple social identification handles or references to the obtained multiple social identification handles and (ii) an interface that shows that at least some of the blank fields of the received set of prospect or contact objects have been filled in.

\* \* \* \* \*